US008955322B2

(12) United States Patent
Bronicki et al.

(10) Patent No.: US 8,955,322 B2
(45) Date of Patent: *Feb. 17, 2015

(54) APPARATUS AND METHOD FOR INCREASING POWER PLANT EFFICIENCY AT PARTIAL LOADS

(75) Inventors: Lucien Y. Bronicki, Yavne (IL); David Machlev, Tel-Aviv (IL)

(73) Assignee: Ormat Technologies Inc., Reno, NV (US)

( * ) Notice: Subject to any disclaimer, the term of this patent is extended or adjusted under 35 U.S.C. 154(b) by 31 days.

This patent is subject to a terminal disclaimer.

(21) Appl. No.: 13/412,155

(22) Filed: Mar. 5, 2012

(65) Prior Publication Data

US 2013/0227947 A1    Sep. 5, 2013

(51) Int. Cl.
| F01K 13/02 | (2006.01) |
| F01K 23/04 | (2006.01) |
| F01K 25/08 | (2006.01) |
| F03G 6/06 | (2006.01) |

(52) U.S. Cl.
CPC ............... F01K 13/02 (2013.01); *F03G 6/067* (2013.01); F01K 23/04 (2013.01); F01K 25/08 (2013.01)
USPC ................ 60/652; 60/651; 60/664; 60/641.8; 60/671; 60/655

(58) Field of Classification Search
CPC ......... F01K 13/02; F01K 25/08; F03G 6/005; F03G 6/067
USPC ............. 60/641.2, 641.8, 650–655, 648, 664, 60/665, 667, 671, 676
See application file for complete search history.

(56) References Cited

U.S. PATENT DOCUMENTS

| 4,120,159 A | | 10/1978 | Matsumoto et al. |
| 5,628,183 A | * | 5/1997 | Rice ........................... 60/39.182 |
| 5,704,209 A | * | 1/1998 | Bronicki et al. ................ 60/650 |
| 5,887,418 A | * | 3/1999 | Bruckner et al. ............... 60/783 |
| 6,298,663 B1 | * | 10/2001 | Bronicki et al. ............. 60/641.2 |
| 6,393,822 B2 | * | 5/2002 | Nagashima ...................... 60/783 |
| 6,694,738 B2 | * | 2/2004 | Bronicki et al. ............. 60/641.8 |
| 7,036,315 B2 | * | 5/2006 | Kang et al. ....................... 60/653 |
| 7,131,259 B2 | | 11/2006 | Rollins, III |
| 2006/0174622 A1 | * | 8/2006 | Skowronski ................. 60/641.8 |

(Continued)

FOREIGN PATENT DOCUMENTS

| EP | 2 354 474 A1 | 8/2011 |
| WO | WO 2011124408 A2 * | 10/2011 |

OTHER PUBLICATIONS

International Search Report issued Jun. 20, 2013 in PCT/IB2013/000187.
U.S. Appl. No. 13/398,326, filed Feb. 16, 2012, Bronicki.
U.S. Appl. No. 13/401,467, filed Feb. 21, 2012, Bronicki.

*Primary Examiner* — Thomas Denion
*Assistant Examiner* — Laert Dounis
(74) *Attorney, Agent, or Firm* — Oblon, Spivak, McClelland, Maier & Neustadt, L.L.P.

(57) ABSTRACT

For increasing power plant efficiency during periods of variable heat input or at partial loads, a motive fluid is cycled through a Rankine cycle power plant having a vaporizer and a superheater such that the motive fluid is delivered to a turbine at a selected inlet temperature at full admission. A percentage of a superheated portion of the motive fluid is adjusted during periods of variable heat input or at partial loads while virtually maintaining the inlet temperature and power plant thermal efficiency.

7 Claims, 5 Drawing Sheets

(56) References Cited

U.S. PATENT DOCUMENTS

| | | | |
|---|---|---|---|
| 2008/0163625 A1* | 7/2008 | O'Brien | 60/651 |
| 2008/0289313 A1 | 11/2008 | Batscha et al. | |
| 2010/0071368 A1* | 3/2010 | Kaplan et al. | 60/651 |
| 2010/0242474 A1 | 9/2010 | Berger et al. | |
| 2011/0277469 A1* | 11/2011 | Brenmiller et al. | 60/641.8 |
| 2012/0137683 A1* | 6/2012 | Jurgen et al. | 60/641.8 |
| 2013/0019599 A1* | 1/2013 | Birnbaum et al. | 60/641.15 |

* cited by examiner

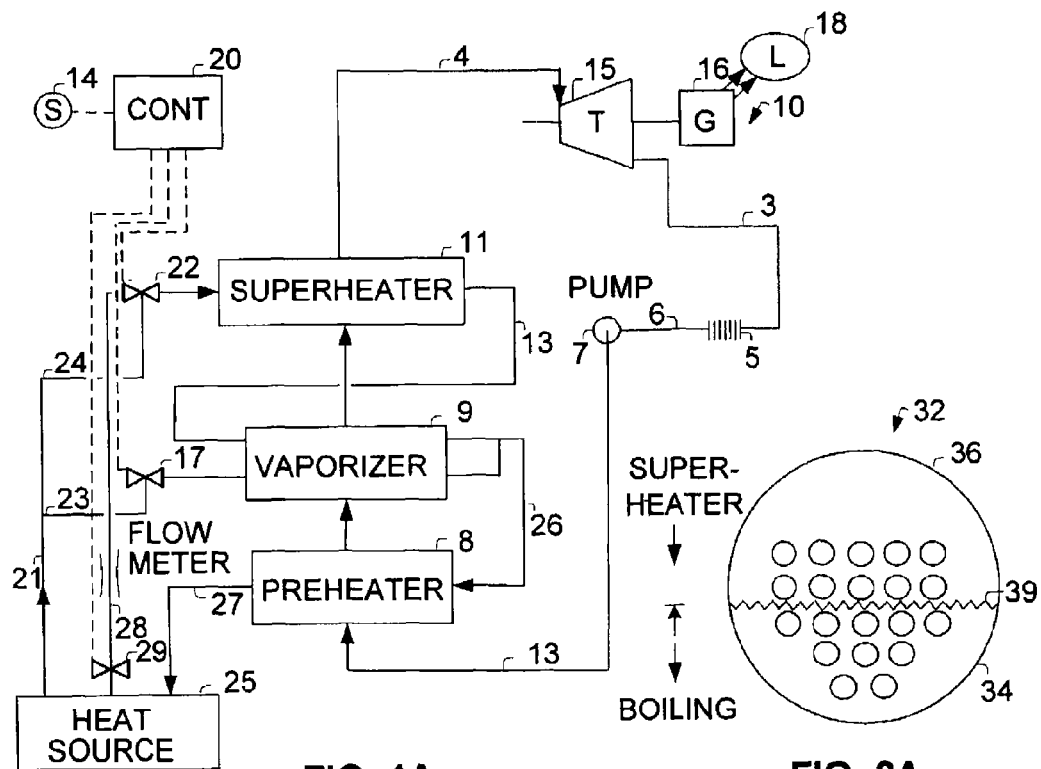
FIG. 1A
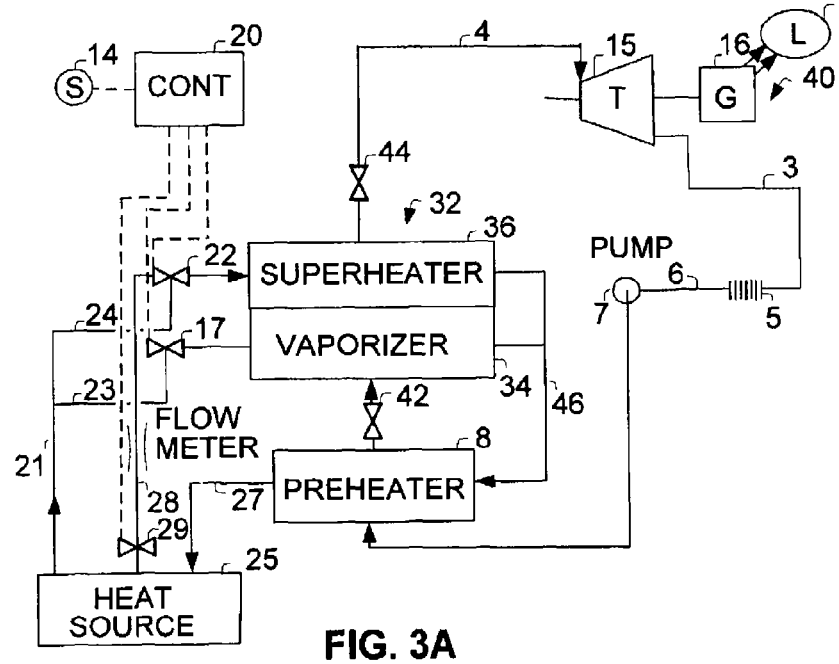
FIG. 2A
FIG. 3A

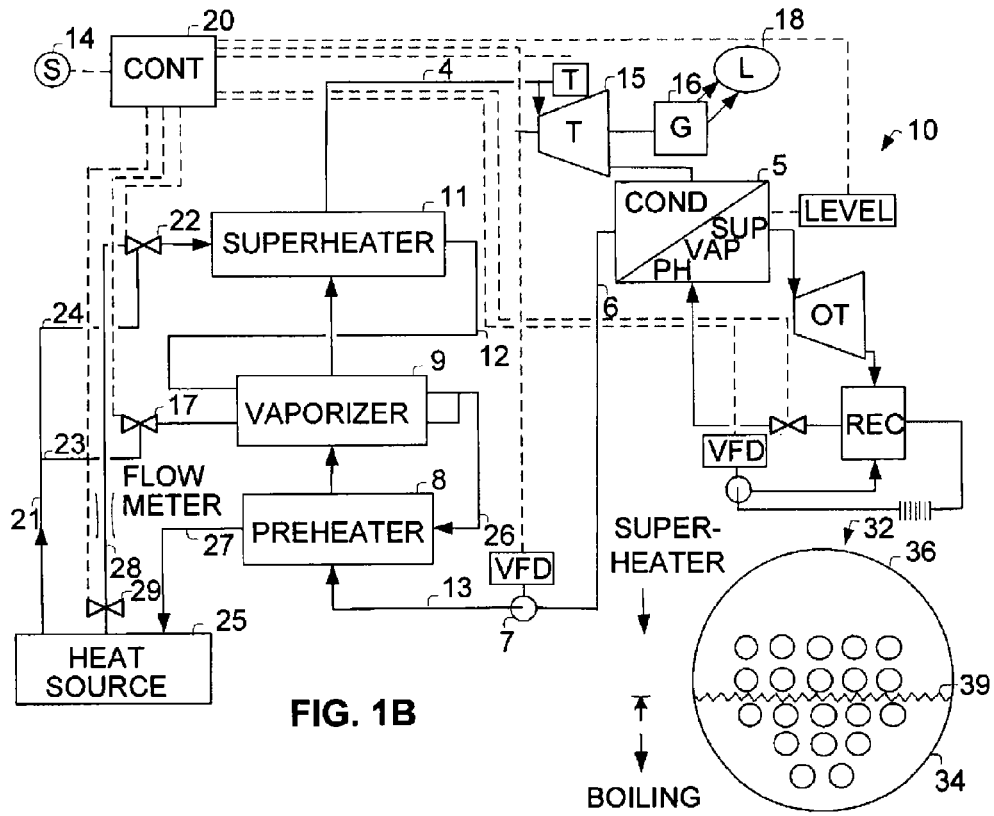
FIG. 1B
FIG. 2B
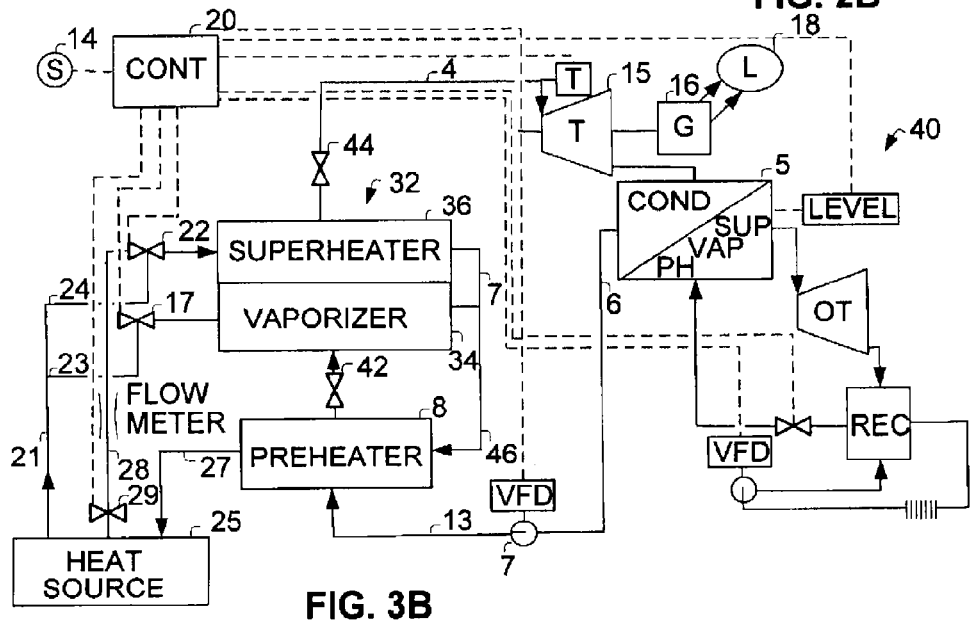
FIG. 3B

APPARATUS AND METHOD FOR INCREASING POWER PLANT EFFICIENCY AT PARTIAL LOADS

FIELD

The present invention relates to the field of thermodynamic cycles. More particularly, the invention relates to an apparatus and method for increasing power plant efficiency at partial loads.

BACKGROUND

Many power plants operate during conditions of partial loads or variable heat input, and several methods are known how to continuously produce power despite a change in the heat input.

In one method, a partial admission turbine is employed whereby motive fluid is admitted over only a selected circumferential distance of the annular area available at the turbine blade inlet. A decrease in turbine efficiency results since only a portion of the turbine blades is filled with motive fluid although the entire portion of the rotating blades is subject to frictional losses. Also, added costs are involved due to the need of a plurality of injection valves in order to ensure the partial admission and due to the need to reinforce the turbine blades as a result of the harsh load conditions, i.e. variable pressure for each rotation.

In another method, a turbine injection valve is throttled to control the mass flow rate of motive fluid admitted to the turbine. However, the internal efficiency of the turbine is reduced during a partial load due to the pressure drop and irreversibility of the injection valve during throttling. Also, the stages following the inlet stage suffer from inefficiencies.

At times, variable nozzles are employed; however, they are complex and are associated with leakage losses and maintenance problems.

In a third method, the thermal efficiency of a power plant is maintained by employing a regenerative cycle whereby condensate is pumped around the turbine casing, counterflow to the direction of the flow of the motive fluid being expanded within the turbine while heat is being transferred thereto. Due to the cost of the additional equipment, including valves, pumps and control devices, and of construction work to provide extraction ports on the turbine casing, a power plant employing a regenerative cycle is uneconomical and is implemented only in very large power plants, e.g. having a capacity of 100-1000 MW.

In a fourth method, the boiler temperature or pressure is controlled as a function of the variable load or the variable heat input. Thermal efficiency of the power plant is reduced because of the lower temperature.

The present invention provides an apparatus and method for improving power plant efficiency at partial loads or reduced heat input which are not subject to thermodynamic losses as a result of reduced heat input.

Additionally, the present invention provides an apparatus and method for improving power plant efficiency at partial loads or reduced heat input without suffering from losses associated with throttling or partial admission.

Furthermore, the present invention provides an apparatus and method for improving power plant efficiency at partial loads or reduced heat input without the complexity of regenerative cycles.

Other advantages of the invention will become apparent as the description proceeds.

SUMMARY

The present invention is directed to a method for increasing power plant efficiency during periods of variable heat input or at partial loads, comprising the steps of cycling a motive fluid through a Rankine cycle power plant having a vaporizer and a superheater such that said motive fluid is delivered to a turbine at a selected inlet temperature at full admission; and adjusting a percentage of a superheated portion of said motive fluid during periods of variable heat input or at partial loads while virtually maintaining said inlet temperature and a power plant thermal efficiency.

In one aspect, the percentage of the superheated portion of the motive fluid is increased during periods of partial load, thereby reducing the density as well as the mass flow rate of the motive fluid.

In one aspect, the percentage of the superheated portion of the motive fluid is increased during periods of decreased heat input, thereby decreasing the density as well as the mass flow rate of the motive fluid.

In one aspect the step of cycling a motive fluid through a Rankine cycle power plant having a vaporizer and a superheater is carried out by cycling a motive fluid through a Rankine cycle power plant having a separate vaporizer and a separate superheater.

In one aspect the step of cycling a motive fluid through a Rankine cycle power plant having a vaporizer and a superheater is carried out by cycling a motive fluid through a Rankine cycle power plant having a vaporizer and a superheater, said vaporizer and said superheater comprising a vaporizer section and a superheater section of a single heat exchanger.

The present invention is also directed to a power plant having increased efficiency during periods of variable heat input or at partial loads, comprising a Rankine Cycle power plant through which a motive fluid is cycled, comprising a condenser, a vaporizer section, a superheater section, and a turbine; a heat source; and a conduit circuit extending from said heat source to each of said vaporizer section and said superheater section, for regulating flow therethrough of source heat fluid adapted to transfer heat to said motive fluid and thereby adjusting a percentage of a superheated portion of said motive fluid during periods of variable heat input or at partial loads, while virtually maintaining an inlet temperature at which said motive fluid is delivered to said turbine at full admission and a power plant thermal efficiency.

The heat source is selected from the group consisting of a solar thermal source, a cogeneration source, a geothermal source, and a waste heat recovery source.

BRIEF DESCRIPTION OF THE DRAWINGS

In the drawings:

FIG. 1A is a schematic drawing of a power plant according to another embodiment of the present invention using water/steam as the motive fluid of the power plant;

FIG. 1B is a schematic drawing of a power plant according to another embodiment of the present invention using a combined cycle the power plant;

FIG. 2A is a schematic vertical cross sectional view of a heat exchanger module according to another embodiment of the invention using water/steam as the motive fluid of the power plant;

FIG. 2B is a schematic vertical cross sectional view of a heat exchanger module according to another embodiment of the invention using a combined cycle power plant;

FIG. 3A is a schematic drawing of a power plant employing the heat exchanger module of FIG. 2A using water/steam as the motive fluid of the power plant;

FIG. 3B is a schematic drawing of a power plant employing the heat exchanger module of FIG. 2B using a combined cycle power plant;

Similar reference numerals refer to similar components.

DETAILED DESCRIPTION

Due to the declining supply of fossil fuels, alternative heat sources for the generation of power have been considered. Many of these heat sources, including those for use in solar thermal, cogeneration, geothermal and waste heat recovery plants, can have variable heat sources, or alternatively, can be utilized at partial loads because of various economic considerations.

Various prior art methods have been practiced heretofore for continuously producing power by the expansion of a motive fluid within a turbine despite a change in the heat input in the load which consumes the generated power. Many of these prior art methods deal with ways to lower the mass flow of the motive fluid introduced to the turbine in response to a lowered heat input or in response to a lowered load demand; however, these methods are associated with irreversibilities, which, when taken into consideration, reduce the thermal efficiency of the given power plant. Other prior methods are uneconomical, adding unnecessary costs to the power plant. In other prior art methods, the temperature of the motive fluid delivered to the turbine is reduced in response to a lowered heat input or a reduced load, resulting in a corresponding reduced thermal efficiency.

The present invention provides a novel method for increasing the thermal efficiency of a power plant based on a Rankine Cycle relative to prior art methods, during periods of variable heat input or at partial loads, by changing the mass flow of the motive fluid introduced by full admission to the turbine while maintaining a constant inlet temperature without suffering from the irreversibilities associated with the prior art methods. The mass flow rate is changed by adjusting the percentage of the motive fluid introduced to the turbine which is superheated. The density of the motive fluid is consequently changed. As the mass flow rate is a function of the motive fluid density, the mass flow rate is changed as well.

Figures 1, 2:
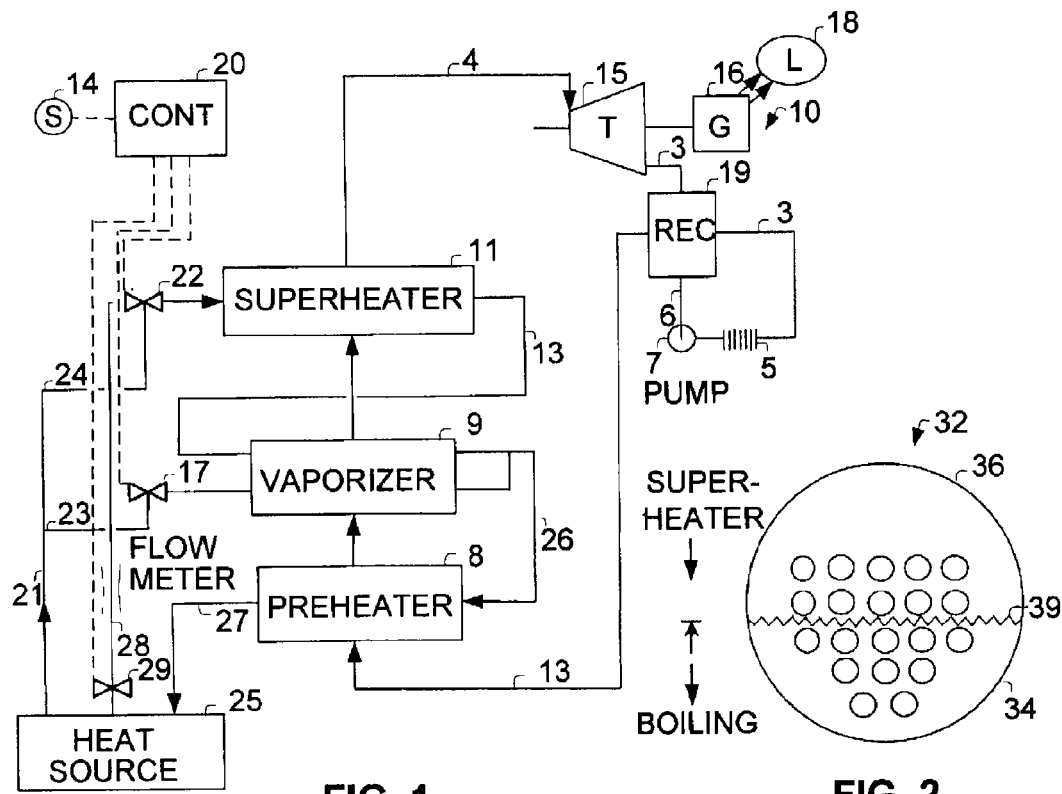
FIG. 1 is a schematic drawing of a power plant according to one embodiment of the present invention using organic motive fluid as the motive fluid of the power plant.
FIG. 2 is a schematic vertical cross sectional view of a heat exchanger module according to one embodiment of the invention using organic motive fluid as the motive fluid of the power plant.

FIG. 1 schematically illustrates a Rankine based power plant 10 providing an increased thermal efficiency when heat input is changed or at partial load, according to one embodiment of the present invention. Condensate pump 7 delivers motive fluid condensate from condenser 5 via conduit 3 to recuperator 19. The heated motive fluid condensate exiting recuperator 19 is then delivered serially via conduit 13 to preheater 8, vaporizer or boiler 9 and superheater 11, and is further heated by source heat fluid flowing through the preheater, vaporizer or boiler and superheater. Superheater 11 may be a unit separate from vaporizer 9. The heated motive fluid vapor produced exiting superheater 11 and now superheated is supplied via conduit 4 to turbine 15. The motive fluid vapor is expanded in turbine 15 which drives electric generator 16 to generate electricity as required by load 18, which may be at partial load. Expanded motive fluid vapor exits turbine 15 via conduit 3 and is supplied to recuperator 19 and provides heat to motive fluid condensate and thereafter is supplied via conduit 6 to condenser 5.

Heat is transferred to the motive fluid flowing through vaporizer 9 and superheater 11 by means of a source heat fluid which has been heated by a suitable heat source 25, which can be a variable heat source.

The source heat fluid flows through conduit 21 which exits heat source 25 and then branches into conduits 23 and 24 leading to vaporizer 9 and superheater 11, respectively. Valves 17 and 22 are operatively connected to conduits 23 and 24, respectively, and are used to regulate the percentage of the motive fluid introduced to turbine 15 which is superheated. The source heat fluid also flows through an additional conduit 28, which extends from heat source 25 to valve 22, in order to control the mass flow rate of heat source fluid supplied to superheater 11 and therefore the heat influx to the superheater.

When load 18 has decreased below a predetermined level, valve 22 operatively connected to conduit 24 is additionally opened and valve 17 operatively connected to conduit 23 is additionally closed, to allow an increased percentage of the motive fluid to be superheated. Valve 29 operatively connected to conduit 28 is opened when it is desired to superheat the motive fluid to even a greater extent. The source heat fluid exiting superheater 11 is delivered to vaporizer 9 via conduit 13 and serves as an additional means to vaporize the motive fluid, in addition to the source heat fluid flowing through conduit 23. The heat depleted source heat fluid exiting vaporizer 9 flows via conduit 26 to preheater 8, and is then discharged from the latter via conduit 27 to heat source 25, in order to be heated once again.

When the heat input to heat source 25 has decreased below a predetermined level, valve 22 is increasingly opened and valve 17 is increasingly closed, to allow an increased percentage of the motive fluid to be superheated. Alternatively, only valve 22 is regulated, being set to an increasingly opened condition, while the degree of opening provided by valve 17 remains unchanged. If so desired, only valve 17 is regulated, being set to an increasingly closed condition, while the degree of opening provided by valve 22 remains unchanged.

The heat input to heat source 25 may be detected by a suitable sensor 14, which may be in electrical communication with a controller 20. Controller 20 may then control one or more of control valves 17, 22 and 29 to regulate its degree of opening in response to the degree of change in heat input, to produce a corresponding percentage of superheated fluid and to ensure that a suitable mass flow rate of motive fluid will flow through turbine 15. Controller 20 may also control condensate pump 7 to adjust the volumetric flow rate of the condensate in response to the change in heat input [e.g. using a variable frequency drive (VFD)].

The power W produced by turbine 15 is expressed by the relation:

$$W = m^* \eta (h_1 - h_2),\quad \text{(Equation 1)}$$

where m is the mass flow rate of the motive fluid, $\eta$ is the isoentropic turbine efficiency, $h_1$ is the enthalpy of the motive fluid at a point on the saturated vapor curve, and $h_2$ is the enthalpy of the motive fluid following the turbine expansion process. The maximum possible work that can be produced by turbine 15 would result if the motive fluid vapors were to expand in the turbine isoentropically, i.e. adiabatically and reversibly. Thus, isoentropic turbine efficiency $\eta$ is equal to the ratio of actual work to the isoentropic work.

While prior art methods ensure that mass flow rate in of the motive fluid admitted into turbine 15 will be suitably reduced upon a decrease in the required load, the methods are associated with characteristic irreversibilities and result in a reduction of turbine efficiency $\eta$. As a result, the total amount of power W produced by turbine 15, which is directly controlled by turbine efficiency n, is also reduced.

By being able to reduce mass flow rate m of the motive fluid upstream of turbine 15, turbine efficiency $\eta$ is advantageously able to be maintained and will not be subject to losses associated with the reduction of the mass flow rate upon introduction of the motive fluid vapor flow into the turbine.

The mass flow rate in, itself, of the motive fluid introduced into the turbine is expressed by the following relation:

$$m = \rho^* V,\quad \text{(Equation 2)}$$

where $\rho$ is the density of the fluid and V is the volumetric flow rate thereof produced by condensate pump 7. Upon increasing the percentage of superheated portion within the motive fluid vapor, the density $\rho$, and likewise the mass flow rate in, of the motive fluid flowing at a given flow rate V within conduit 4 will be correspondingly reduced. On the other hand, the density $\rho$ and mass flow rate m of the motive fluid flowing to the turbine will be increased when the percentage of the superheated motive fluid vapor portion is reduced. Mass flow rate in may therefore be controlled and differentially varied by adjusting the values of density $\rho$ by regulating valves 17 and 22 and modifying the volumetric flow rate V produced by pump 7 using e.g. a variable frequency drive (VFD). The power plant efficiency is accordingly increased by controlling flow rate V in response to load 18 or to the heat input, thereby reducing parasitic losses normally associated with a constantly operating condensate pump.

In the embodiment shown in FIG. 2, a heat exchanger module 32 provided with a lower vaporizing section 34 and an upper superheating section 36 for use in the power plant. Both vaporizing section 34 and superheating section 36 comprise a plurality of tubes extending through the interior of heat exchanger module 32, through which the source heat fluid flows, in order to transfer heat therefrom to the motive fluid.

Liquid motive fluid is introduced into the shell interior of heat exchanger module 32 and brought in heat exchanger relation with the tubes of vaporizing section 34, causing the liquid motive fluid to be vaporized. The motive fluid vapor produced flows to the superheating section 36 of heat exchanger module 32.

When a reduction in load is detected, less liquid motive fluid is admitted into the heat exchanger module shell interior, so that the level 39 of the liquid motive fluid therewithin is decreased. As a result, less liquid motive fluid is brought in heat exchanger relation with the tubes of both vaporizing section 34 and more motive fluid vapor is brought in heat exchanger relation with the tubes of superheating section 36, causing an increased predetermined percentage of the motive fluid to become superheated. By being superheated, the vapor density of the motive fluid vapor is reduced, allowing the motive fluid vapor to be delivered to the turbine at full admission without any reduction in turbine efficiency.

Figure 3:
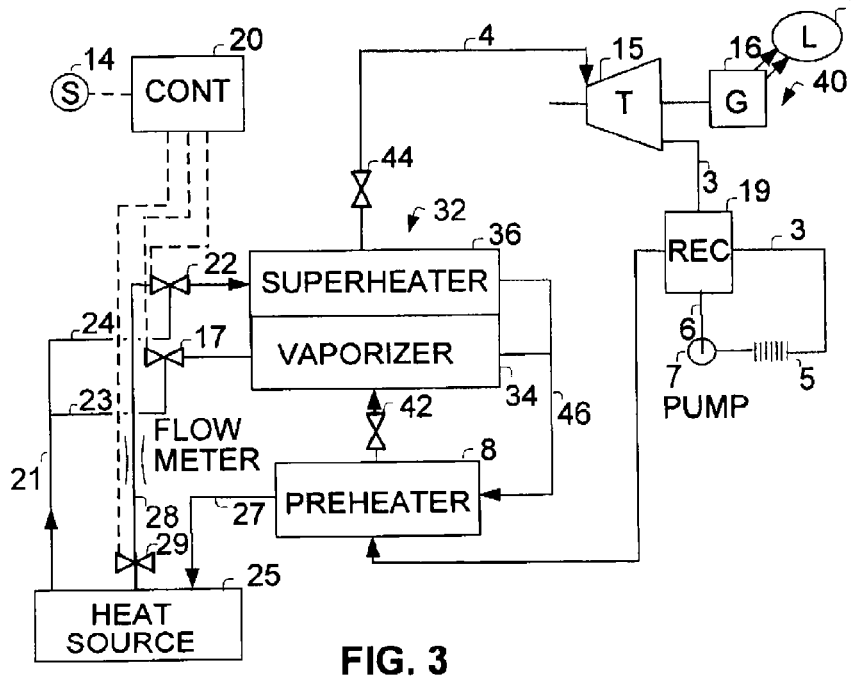
FIG. 3 is a schematic drawing of a power plant employing the heat exchanger module of FIG. 2 using organic motive fluid as the motive fluid of the power plant.

FIG. 3 illustrates power plant 40 which employs heat exchanger module 32. Power plant 40 is identical to power plant 10 of FIG. 1, with the exception of the use of heat exchanger module 32.

Heat exchanger module 32 is equipped with valves 42 and 44 in order to isolate the motive fluid within the interior of heat exchanger module 32 when it is desired to change the level of the liquid motive fluid therewithin. During normal operation of heat exchanger module 32, the liquid motive fluid assumes a predetermined level when flowing through the shell-side interior of heat exchanger module 32 and across the tubes. When it is desired to increase the level of the liquid motive fluid within the heat exchanger module, the degree of opening of outlet valve 44 is decreased so that the residing time of the liquid motive fluid within the heat exchanger interior will be increased. Conversely, the degree of opening of inlet valve 42 is increased so that the residing time of the liquid motive fluid within the heat exchanger interior will be decreased when it is desired to lower the level of the liquid motive fluid within the heat exchanger module.

The source heat fluid exiting both vaporizing section 34 and superheating section 36 is collected in conduit 46 and delivered to preheater 8.

An important aspect of the present invention is the ability to maintain the temperature of the motive fluid at the turbine inlet to be substantially uniform despite a change in load or heat input.

Figure 5:
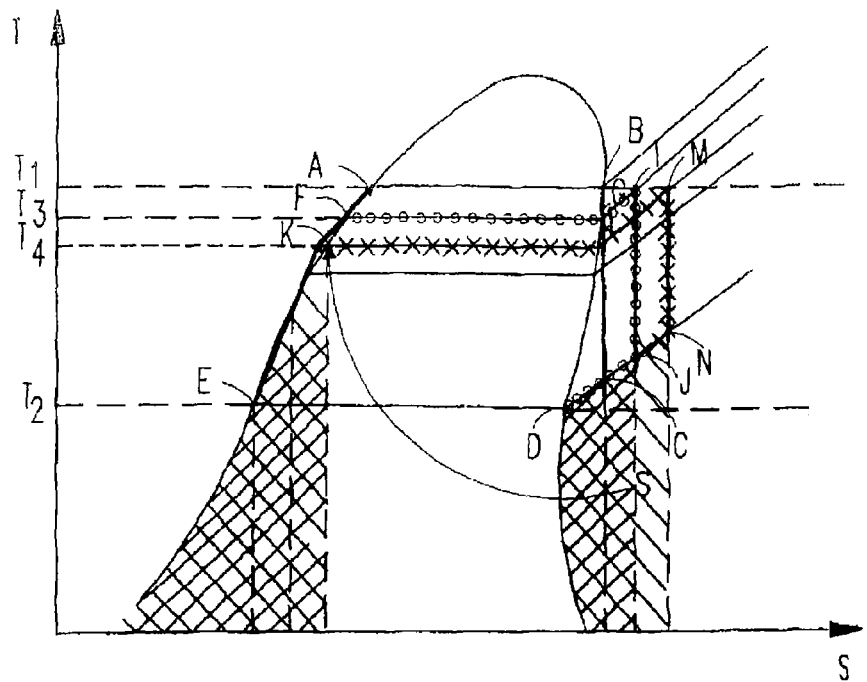
FIG. 5 is a temperature-entropy diagram of an organic motive fluid subjected to the thermodynamic cycles of the present invention.

Reference is now made to FIG. 5, which illustrates an off-center temperature-entropy diagram of an organic motive fluid when subjected to the thermodynamic cycles of the present invention. Such organic motive fluids are advantageously used in organic motive fluid based Rankine cycle power plants described with reference to FIGS. 1 and 3. FIG. 2 shows an example of a heat exchanger module 32 provided with a lower vaporizing section 34 and an upper superheating section 36 for use in such organic motive fluid based Rankine cycle power plants (see e.g. FIG. 3). Non-limiting examples of such an organic motive fluid is butane, pentane, hexane, etc.

During normal operation of the power plant at full load, the motive fluid is heated virtually isothermally at temperature $T_1$ (e.g. 170° C.) by the vaporizing or boiler section from state A to state B, at which the motive fluid is essentially saturated vapor. During expansion to state C within the turbine, the organic motive fluid becomes superheated while its temperature decreases (to e.g. 77° C.) as well as its pressure, and its temperature further decreases from state C to state D during the recuperating stage (to e.g. 40° C.). The motive fluid is condensed virtually isothermally at temperature $T_2$ from state D to state E. Liquid motive fluid exiting the condenser is preheated in the recuperator from temperature $T_2$ (from e.g. 35° C.) to the exit liquid temperature of the recuperator e.g. 72° C. In such an example, the gross electric power output would be 10 MW.

When the load drops, whether unexpectedly or due to a known reason, the power level produced by the turbine needs to be reduced. By virtue of the method of the present invention, the motive fluid can continue to be delivered to the turbine at the same temperature $T_1$ despite a drop in the required load, while benefiting from close to the same power plant thermal efficiency and turbine efficiency.

At partial load, for example half load, the temperature at which the motive fluid can be virtually isothermally heated from state F to state G by the vaporizer or boiler can be reduced to $T_3$ (e.g. 147° C.), which is lower than temperature $T_1$. The vaporized motive fluid is then controllably superheated by the source heat fluid, such that the percentage of the portion of superheated vapors is increased (to about 11.5%), to virtually the same turbine inlet temperature $T_1$ (e.g. 170° C.) at state I, thereby achieving a sufficiently low motive fluid density and consequently mass flow rate for the partial load. The motive fluid at full admission is then expanded by the turbine to state J.

Similarly, at quarter load, for example, the temperature at which the motive fluid can be virtually isothermally heated from state K to state L by the vaporizer or boiler can be reduced to $T_4$ (e.g. 123° C.), which is between temperatures $T_3$ and $T_2$. The portion of superheated motive fluid vapor is further increased (to about 21.5%) so as to be superheated to the same turbine inlet temperature $T_1$ at state M, after which the motive fluid is expanded by the turbine to state N, recuperated to state D, and condensed to state E.

During periods of reduced heat input when e.g., the vaporizer or boiler can virtually isothermally heat the motive fluid to a temperature of, no greater than $T_4$ or $T_3$, the percentage of the superheated portion within the motive fluid is relatively increased, e.g. by reducing the flow of source heat fluid to the vaporizer or boiler section and increasing the flow of source heat fluid to the superheater section. The mass flow rate of the motive fluid is therefore decreased due to its decreased density, leading to a decrease in the power produced by the turbine (see Equation 1) due to the reduced heat input. By controlling the temperature increase of the motive fluid while being superheated such that it will virtually achieve a temperature of $T_1$, the thermal efficiency of the cycle is advantageously virtually maintained at a uniformly high level despite a drop in the heat input.

Figure 6:
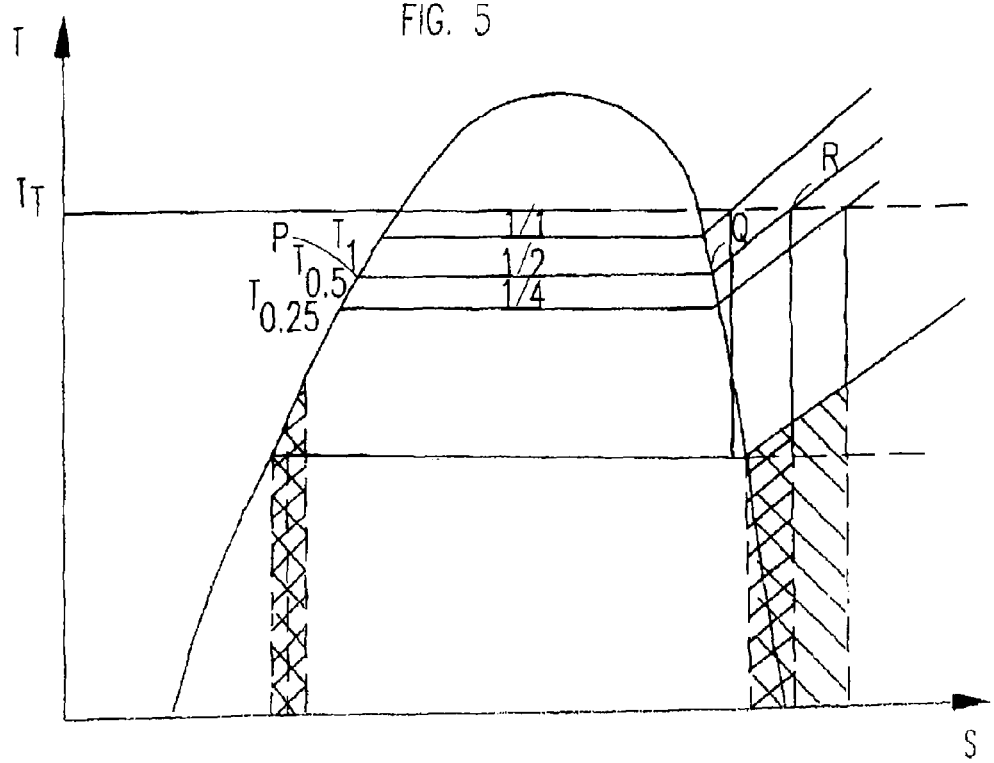
FIG. 6 is a temperature-entropy diagram of a steam motive fluid subjected to the thermodynamic cycles of the present invention.

As shown in FIG. 6, the ability of adjusting the superheated percentage of the motive fluid is also applicable to a steam based Rankine cycle. FIGS. 1A and 3A show examples of embodiments using a steam based Rankine cycle power plants while FIG. 2A shows an example of a heat exchanger module 32 provided with a lower vaporizing section 34 and an upper superheating section 36 for use in such steam based Rankine cycle power plants (see FIG. 3A). The operation of these embodiments using steam as the motive fluid is similar the embodiments described with reference to FIGS. 1, 2 and 3 where an organic motive fluid is used. However, in the present embodiments, little use of a recuperator or equivalent usually needs to be made. The temperature-entropy diagram of steam when subjected to the thermodynamic cycles of the present invention is bell-shaped, resulting in an increase of its moisture content when the saturated steam is expanded at full load even if superheating is used. Here, e.g. the vaporizing or boiling temperature of about 230° C. can be used with the superheater raising the temperature of the steam to 350° C. at the inlet of the steam turbine.

At a partial load, for example half load, the temperature at which the motive fluid can be virtually isothermally heated from state P to state Q by the vaporizer or boiler can be reduced from the full load vaporizing temperature $T_1$ to $T_{1/2}$ (about 200° C.). The vaporized motive fluid is then controllably superheated by the source heat fluid to virtually the same turbine inlet temperature $T_t$ (350° C.) at state R as was achieved during full load, to maintain a virtually uniform power plant thermal efficiency. The percentage of the superheated portion may be selected such that when expanded within the turbine at full admission from state R to state S, the motive fluid remains in a superheated state to prevent corrosion to the turbine blades.

In a further embodiment of the present invention described with reference to FIGS. 1B, 2B and 3B, a combined cycle power plant can be used. In this embodiment, energy available at relatively low temperatures in the steam cycle can be used as heat input into a bottoming organic Rankine cycle power plant. Also here, optimal efficiencies and power output of the power plant can be achieved by controlling the superheat level of the steam as well as advantageously controlling the amount of superheat and recuperation used in the organic Rankine cycle power plant using the methods and apparatus previously described with reference to FIGS. 1, 2, 3 and FIGS. 1A, 2A and 3A. This can be particularly effective in solar and waste heat power plants and also effective extent in geothermal power plants.

It is to be pointed out that the non-limiting examples of organic motive fluids can be used as well in the combined cycle power plant described. Furthermore, further non-limiting examples of organic motive fluids used in the embodiments of the present invention can include specifically, the cyclo—version of the non-limiting examples of organic motive fluids previously mentioned. In particular, these cyclo—versions of the non-limiting examples of organic motive fluids can be especially advantageous when a specific power plant is operating in an environment where relatively high ambient temperatures prevail so as to enable the facilitation of the power plant condenser operation permitting relatively high condensing temperatures to be used, if advantageous, so that little if any vacuum levels be present in the power plant condenser.

Figure 4:
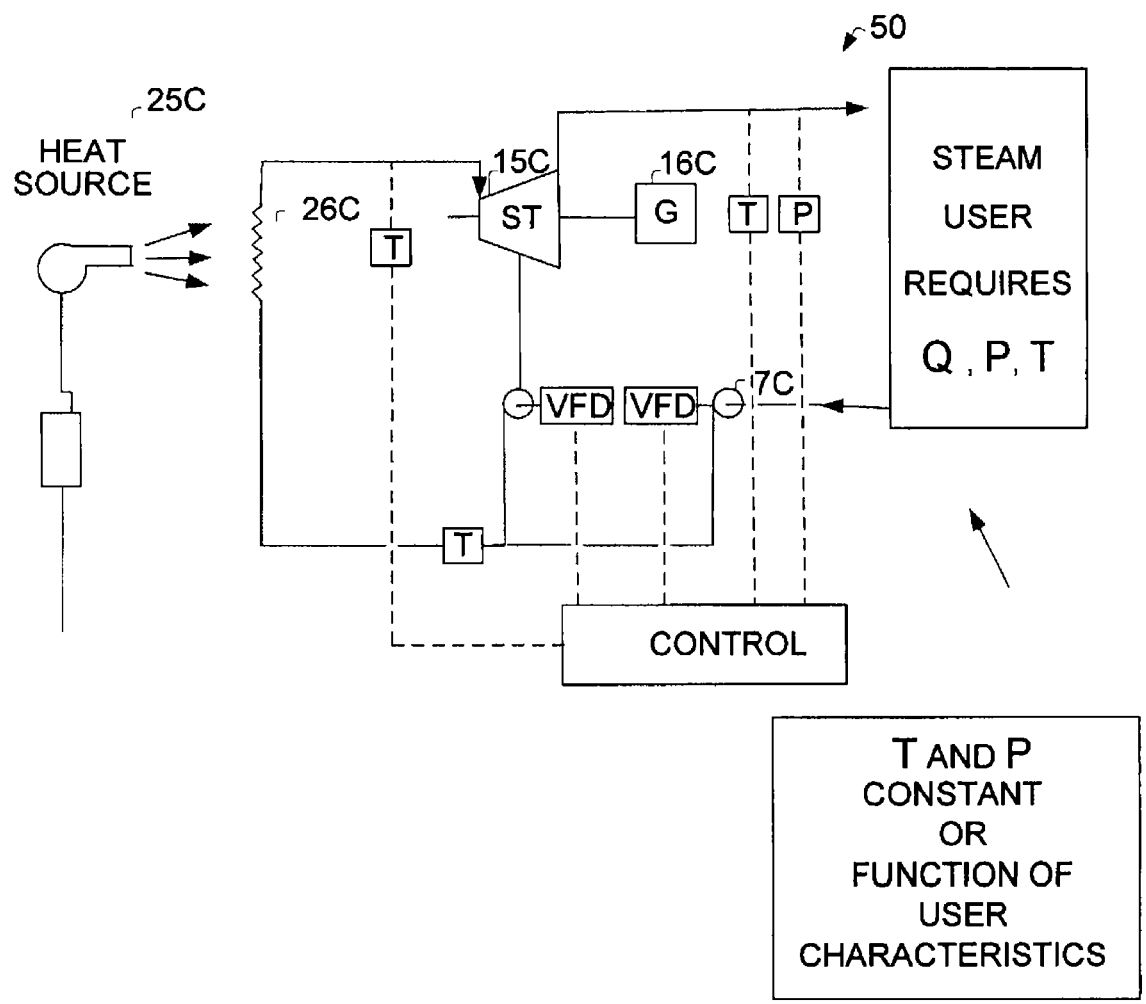
FIG. 4 is a schematic drawing of an embodiment of a cogeneration plant operating in accordance with the present invention.

In an additional embodiment of the present invention described with reference to FIG. 4, a cogeneration plant including a power plant operating in accordance with the present invention can be used. Here, e.g. steam turbine 15C can be used to produce power via the coupled generator while the steam exiting the steam turbine can be supplied to a steam consumer at a required pressure and temperature controlled by controller 20C. Supply pumps 7C and 9C can be controlled by controller 20C using e.g. variable frequency drivers (VFDs) to enable control of the water temperature returned to heat exchanger 26C for receiving heat from heat source 25C.

In accordance with the present invention, control systems such as fuzzy logic systems can be used to carry out the operation and control of the embodiments of the present invention.

Furthermore, in certain case, e.g. geothermal plants, heat recovery plants, etc., the present invention can be added to existing plants by simple modification of sensors and software.

It is to be pointed out that the present invention leads to simplification of such power plants as well as cost reduction of the equipment used in such power plants. In particular, in accordance with the present invention, steam maintenance extraction ports are not required thus reducing the cost of the turbine casing. In addition, the present invention avoids the need for use of additional valves and pumps for controlling regeneration.

Furthermore, the advantageous use of e.g. variable frequency drives (VFDs) for controlling and modifying the flow rate of motive fluid condensate and/or steam condensate improves the overall power plant efficiency and permits the condensate pump power to be proportional to the load.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A method for increasing power plant efficiency during periods of variable heat input to the power plant or at partial loads applied to the power plant, comprising the steps of:

cycling an organic motive fluid through a Rankine cycle power plant having a vaporizer and a superheater such that organic motive fluid vapor produced in the vaporizer and superheated in the superheater is delivered from the vaporizer and superheater to a turbine at a selected inlet temperature at full admission;

providing said vaporizer with a heated fluid heated by a single heat source and conveyed to the vaporizer via a first conduit;

providing said superheater with a heated fluid heated by said single heat source and conveyed to the superheater via a second conduit which comprises a parallel circuit extending from said single heat source in parallel with the first conduit; and using a controller to control the relative amounts of heat respectively input to the vaporizer and to the superheater by controlling the respective flow rates of heated fluid in the respective first and second conduits from the single heat source to said vaporizer and to said superheater via the controller, to adjust a percentage of a superheated portion of said organic motive fluid vapor delivered to said turbine during the periods of variable heat input or at partial loads applied to the power plant, wherein the step of controlling the relative amounts of heat respectively input to the vaporizer and superheater comprises controlling the relative amounts of the heat respectively input to the vaporizer and superheater from the single heat source, and wherein at partial loading the percentage of the superheated portion is adjusted so as to reduce the density and the mass flow rate of the organic motive fluid vapor.

2. The method according to claim 1, wherein the percentage of the superheated portion of the organic motive fluid vapor is adjusted during periods of variable heat input applied to the power plant, thereby reducing the density and the mass flow rate of the organic motive fluid vapor.

3. The method according to claim 1, wherein the step of cycling the organic motive fluid through a Rankine cycle power plant having a vaporizer and a superheater is carried out by cycling the organic motive fluid through a vaporizer and a superheater of the power plant in which organic motive fluid vapor is produced, which vaporizer and superheater are separated from one another.

4. The method according to claim 1, wherein the step of cycling the organic motive fluid through a Rankine cycle power plant having a vaporizer and a superheater is carried out by cycling the organic motive fluid through a vaporizer and a superheater in which organic motive fluid vapor is produced, said vaporizer and said superheater comprising a vaporizer section and a superheater section of a single heat exchanger.

5. The method according to claim 1, wherein the organic motive fluid is heated by the vaporizer and then superheated to the selected inlet temperature.

6. The method according to claim 1, further comprising a step of detecting a reduction in load, wherein the percentage of the superheated portion of the organic motive fluid vapor is increased by:

a) delivering the organic motive fluid to a heat exchanger module having a lower vaporizing section and an upper superheating section, both of which comprise a plurality of tubes extending through an interior of said heat exchanger module and through which source heat fluid flows in order to transfer heat to the organic motive fluid; and b) when the reduction in load is detected, decreasing a level of the organic motive fluid within the interior of said heat exchanger module so as to be brought in heat exchanger relation with an increased number of tubes of said superheating section, thereby increasing the percentage of the superheated portion of the organic motive fluid vapor produced.

7. A method for increasing power plant efficiency during periods of variable heat input to the power plant or at partial loads applied to the power plant, comprising the steps of:

cycling a motive fluid through a Rankine cycle power plant having a vaporizer and a superheater such that motive fluid vapor produced in the vaporizer and superheated in the superheater is delivered from the vaporizer and superheater to a turbine at a selected inlet temperature at full admission;

providing said vaporizer with a heated fluid heated by a single heat source and conveyed to the vaporizer via a first conduit;

providing said superheater with a heated fluid heated by said single heat source and conveyed to the superheater via a second conduit which comprises a parallel circuit extending from said single heat source in parallel with the first conduit; and using a controller to control the relative amounts of heat respectively input to the vaporizer and to the superheater by controlling the respective flow rates of heated fluid to said vaporizer and to said superheater via the controller, to adjust a percentage of a superheated portion of said motive fluid vapor delivered to said turbine during the periods of variable heat input or at partial loads applied to the power plant, wherein the step of controlling the relative amounts of heat respectively input to the vaporizer and superheater comprises controlling the relative amounts of the heat respectively input to the vaporizer and superheater from said single heat source, wherein steam exiting said turbine heats an organic motive fluid for producing superheated organic motive fluid vapor which is supplied to an organic vapor turbine for expanding the superheated organic motive fluid vapor and producing power, and wherein at partial loading the percentage of the superheated portion is adjusted so as to reduce the density and the mass flow rate of the motive fluid vapor.

* * * * *